United States Patent
Vitt et al.

(10) Patent No.: US 9,025,600 B1
(45) Date of Patent: May 5, 2015

(54) MULTICAST PROXY FOR PARTITIONED NETWORKS

(75) Inventors: Michael Vitt, Middletown, NJ (US); Bin He, Morganville, NJ (US); George F. Elmasry, Howell, NJ (US)

(73) Assignee: D&S Consultants, Inc., Eatontown, NJ (US)

( * ) Notice: Subject to any disclaimer, the term of this patent is extended or adjusted under 35 U.S.C. 154(b) by 119 days.

(21) Appl. No.: 13/484,333

(22) Filed: May 31, 2012

(51) Int. Cl.
| | |
|---|---|
| *G01R 31/08* | (2006.01) |
| *H04L 12/28* | (2006.01) |
| *H04L 12/18* | (2006.01) |
| *H04L 12/801* | (2013.01) |
| *H04L 12/835* | (2013.01) |
| *H04L 12/54* | (2013.01) |

(52) U.S. Cl.
CPC .............. *H04L 12/18* (2013.01); *H04L 12/5602* (2013.01); *H04L 47/11* (2013.01); *H04L 12/185* (2013.01); *H04L 47/30* (2013.01); *H04L 47/10* (2013.01)

(58) Field of Classification Search
CPC ........ H04L 12/18; H04L 12/185; H04L 45/16
USPC ......................................... 370/390, 253, 230
See application file for complete search history.

(56) References Cited

U.S. PATENT DOCUMENTS

| | | | | |
|---|---|---|---|---|
| 2006/0203819 | A1* | 9/2006 | Farinacci et al. | 370/390 |
| 2008/0117913 | A1* | 5/2008 | Tatar et al. | 370/392 |
| 2009/0296599 | A1* | 12/2009 | Ayyagari et al. | 370/253 |
| 2009/0296708 | A1* | 12/2009 | Zijst | 370/390 |
| 2009/0303997 | A1* | 12/2009 | Zijst | 370/390 |
| 2011/0235550 | A1* | 9/2011 | Adams et al. | 370/255 |
| 2013/0061034 | A1* | 3/2013 | Walheim, Sr. | 713/150 |

* cited by examiner

*Primary Examiner* — Faruk Hamza
*Assistant Examiner* — Abu-Sayeed Haque
(74) *Attorney, Agent, or Firm* — Fox Rothschild LLP; Dennis M. Carleton

(57) ABSTRACT

A method for implementing multicast data exchange over a partitioned network having an encrypted domain with HAIPE devices at the edges consists of proxies running at an ingress edge and at egress edges of the encrypted domain. The proxies at the ingress edge device modify the multicast data packet to replace the destination address with the address of a proxy running on an egress edge device, such that the encrypted domain routes the packet directly to the proxy at the egress edge device without processing it as a multicast data packet. At the egress edge devices, the proxies restore the original address and send the multicast packets to the appropriate destinations.

17 Claims, 2 Drawing Sheets

MULTICAST PROXY FOR PARTITIONED NETWORKS

FIELD OF THE INVENTION

The general field of art includes multicast communications over a partitioned network, and, in particular, over a tactical network partitioned into a plain text (unencrypted or "red") domain and cipher text (encrypted or "black") domain.

BACKGROUND OF THE INVENTION

Multicast is a well known concept that enables the delivery of a message to a group of destination addresses simultaneously, in a single transmission from the sending computer. Copies of the message are automatically created in network elements, such as routers, only when the topology of the network requires it.

Multicast is also known in a tactical network. A typical tactical network is shown in FIG. 1, and consists of an encrypted, or "black" domain 100, and one or more unencrypted, or "red" domains, which may be individual network elements or sub-networks 104. Encryption devices 102 bridge the black and red domains and may be, for example, a HAIPE (High Assurance Internet Protocol Encryptor) enabled router.

There are several well-known methods used to implement multicasts in a partitioned tactical network and, in particular, in a network containing a HAIPE device. One method in use is to create a GRE (generic routing encapsulation) tunnel to bridge the multicasts packets over the HAIPE devices. This method can require the addition of up to 24 bytes of overhead per data packet. Because bandwidth may be limited in the black domain of a tactical network, for instance, when traversing the black core involves a satellite link, the added overhead using this method is significant.

A second approach currently in use is to use two multicast proxies in tandem for each HAIPE device, one on the red side of the HAIPE device and one on the black side of the HAIPE device. This method, however, wastes space and power by requiring additional proxies to create the multicast bridge. Furthermore, this method may require exceptions to existing security protocols to communicate between the two proxies that surround the HAIPE device.

Yet a third method of conducting multicasts transmissions over a partitioned tactical network is to add a multicast proxy to the HAIPE device itself. However, this method requires the latest version of HAIPE devices and will not work with legacy versions. In addition, code changes to the multicast proxy would need to be certified by the National Security Agency, which is a very expensive process.

Thus, it would be desirable to implement a multicast solution for tactical networks that overcomes the deficiencies in the current methods.

SUMMARY OF THE INVENTION

The present invention implements a multicast protocol designed specifically to operate over tactical networks having HAIPE devices at the ingress and egress points of the black domain of the network. The HAIPE devices may be connected to each other and may also have one or more routers between them which traverse the black domain of the network. The invention is implemented as a software module running on edge computers (i.e. computers in the red domain connected to the red side of the HAIPE devices) that act as proxies for the sending and receiving of multicast messages.

The basic idea is to disguise the multicast messages prior to entry into the black domain of the network such that the packets are treated as generic IP packets and not processed as multicast packets within the black domain. In this way, the black domain of the network is "bridged" for multicast packets. Once the packets have entered the red domain of the partitioned network, they are undisguised and recognizable as normal multicast messages.

At the sending proxy, multicast packets will be modified so that the original multicast address is replaced by the address of the receiving multicast proxy. The original multicast address will be saved elsewhere in the packet. This allows the packet to pass through the HAIPE device and all other devices within the black domain of the network without being recognized as a multicast packet, thereby avoiding any processing that may otherwise occur at a router within the black domain. At the remote proxy, the packet will be restored and processed as a normal multicast packet.

This method greatly reduces the overhead of multicast, as a GRE tunnel and its associated overhead are not required. The process of the present invention requires a maximum of only four additional bytes of overhead (to store the original multicast address) added to the packet containing the multicast payload. This method will work with any version of HAIPE and does not require any exceptions to be made to existing security protocols.

The solution of the present invention will enable the multicast protocol, which is intended to work with multiple Ethernet devices, to virtualize the interfaces so that traffic can be sent to the proper remote destination over a HAIPE device that uses only one Ethernet interface. In addition, the proxies of the present invention will provide full support for multicasts so that user applications can send multicast traffic without issues in a manner that eliminates the typical problems involved with multicast over HAIPE devices.

DETAILED DESCRIPTION OF THE INVENTION

Figure 2:
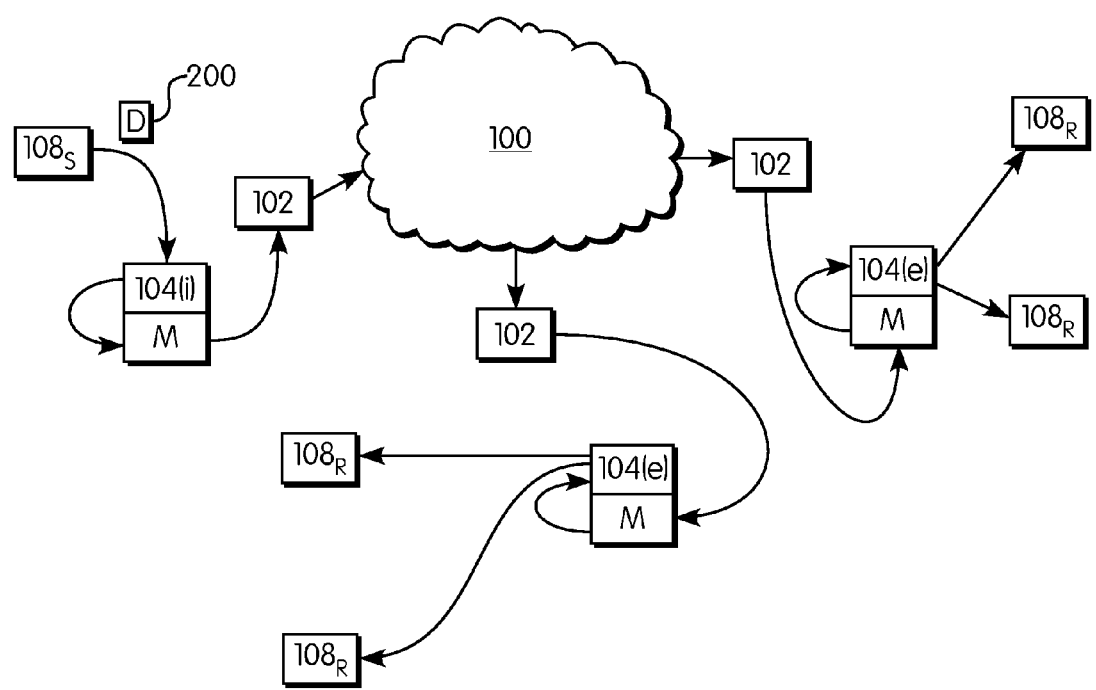
FIG. 2 is a modified tactical network showing the placement of the proxy modules of the present invention.

FIG. 2 is a schematic representation of the topology of the red and black domains of a partitioned network configured to implement the method of the present invention. Referring to FIG. 2, ingress edge computer $104_i$ and egress edge computers $104_e$ are running module M, which implements the functionality of the multicast proxy of the present invention. User computer $108_s$ is running an application sending a multicast message 200 meant for recipients $108_r$.

The message sent from sending computer $108_s$ is routed to an edge device $104_i$ at the ingress of the black domain of the network. Edge device $104_i$ is preferably running a version of the Linux operating system, but the present invention may be implemented on devices running any operating system.

Module M is a software component implementing the features of the invention running on ingress edged device $104_i$. Module M processes multicast message 200 to make it unrecognizable to the HAIPE device as a multicast message. This is accomplished by taking the original multicast address and replacing it with a four byte header which specifies the address of the egress device $104_e$ on the other side of the black domain of the partitioned network. In the preferred embodiment, the original address is placed at the end of the data packet, however, the original address may be stored anywhere in the data packet as long as it does not interfere with the routing of the packet through the black domain.

All edge devices 104 maintain a list of multicast groups and their members such that ingress edge device $104_i$ knows which egress edge devices $104_e$ need to receive the multicast message. The message is then sent out multiple times to all egress edge devices to which members of the multicast group are connected.

Each of the packets transmitted to egress edge devices $104_e$ are sent to HAIPE device 102 where they are encrypted and sent into the black domain of the network. At the other end of the black domain, the packet 200 is received by HAIPE device 102 and is decrypted and sent to egress edge device $104_e$ also running module M implementing the features of the present invention.

At the egress edge device $104_e$, the data packet 200 is processed by module M to remove the added header and to restore the original multicast address in the original address field of the packet. The packet is now recognizable again as a multicast data packet and it is sent to the multicast address over the local network, whereby all local recipients who are members of the multicast group receive the packet. The same process occurs for each egress device $104_e$ receiving the multicast message. In an alternative embodiment of the invention, the egress edge device may maintain a list of local members of the multicast group and may send the multicast data packet to each individual recipient.

It should be noted that with respect to the black domain of the tactical network, the packet is not recognizable as a multicast packet but is only considered a generic IP data packet. As such, no processing is performed on the modules when inside the black domain save for the routing of those modules to the indicated egress edge device $104_e$. This bridging process eliminates many of the multicast problems that can occur over the encrypted core domain.

At the ingress edge computer, module M processes the application data packets in the following manner. If the data packet is multicast application data, the multicast address is appended to the end of the packet and the destination address is changed to the address of an egress edge device running the multicast proxy module M and connected to intended recipient computers.

If data packet 200 is an IGMP (internet group management protocol) or PIM (protocol independent multicast) control packet, used to add or remove members from the multicast group, the source address is appended to the end of the packet and the source unicast address is changed to the local sending proxy address. In addition, a local list is maintained of the member of each multicast group, and, in particular, of the locally accessible computers that are members of that group. The message is then sent to all other known edge devices running the multicast proxy and is used to update the local lists maintained on each proxy.

At the egress edge computer, when module M receives a multicast packet from another proxy, the appended address is checked to see if it is a multicast or unicast (i.e., control) address. If it is a multicast address, module M processes the data as multicast application data. For multicast application data, the destination is changed to the multicast address and the address of the receiving proxy is removed from the packet. The original multicast packet is restored and the message is sent to the local network by the proxy using the multicast address. The local multicast recipients of that group address will then receive the multicast packet. In the alternative embodiment, the proxy checks its local list of multicast group members to determine to which locally connected recipients the message must be sent. If multiple recipients are connected to the egress edge device, the message may be duplicated and sent to multiple recipients.

If the data packet is an IGMP or PIM control message, the source address is used as a proxy address and the appended unicast address as a member address for the multicast group, and the local proxy uses this information to update its locally maintained lists.

Figure 1:
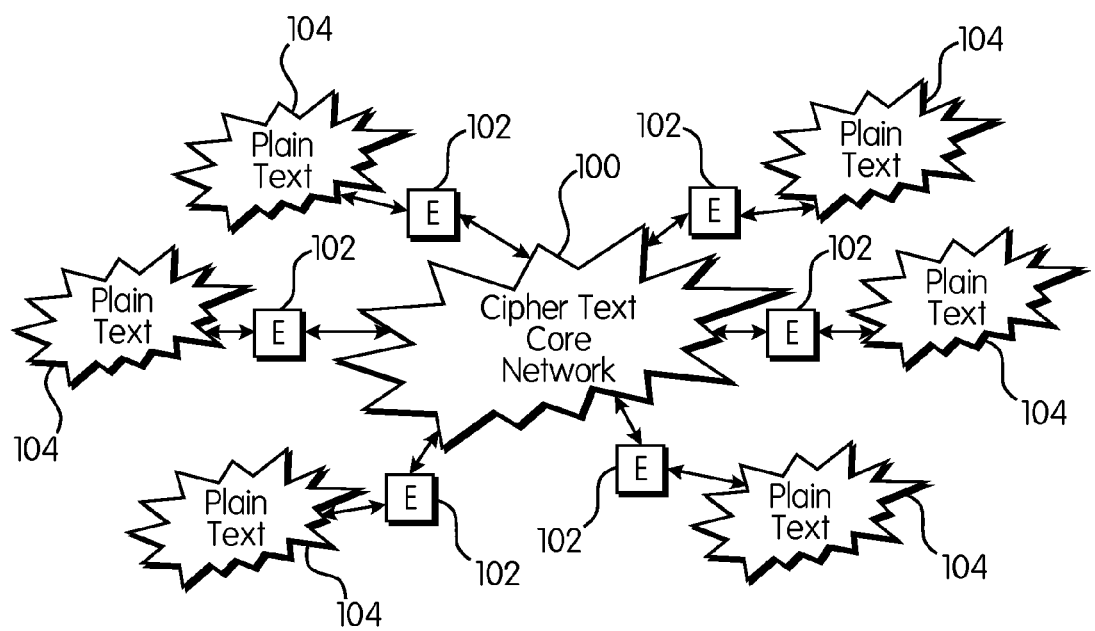
FIG. 1 is a prior art illustration of a tactical network.

It should be noted that ingress edge computer $104_i$ and egress edge computer $104_e$ as shown in FIG. 2 may be one of many such devices in the partitioned tactical network, and are, in reality edge devices which act as both ingress and egress edge devices and which allow data both transmission and reception of multicast messages. It should also be noted that edge devices 104 are typically stand alone computers. However, they may also be dedicated devices providing a gateway to red domains as shown in FIG. 1. In addition, HAIPE encryption modules 102 may be implemented as separate devices or may be a part of edge devices 104.

We claim:

1. A system for implementing multicast messaging in a partitioned network, said partitioned network including an encrypted domain, comprising:
    two or more devices acting as edge devices to the encrypted domain of said network, said devices running a multicast proxy module;
    wherein said multicast proxy module performs the following functions for sending multicast messages:
        (a) intercepting outgoing multicast packets;
        (b) determining which edge devices have intended recipients of said multicast messages connected thereto;
        (c) for each edge device having one or more intended recipients attached thereto, removing the multicast address and replacing it with the address of the edge device to which the intended recipient is connected;
        (d) storing the multicast address elsewhere in said multicast packet; and
        (e) sending the modified multicast packet through said encrypted domain to each of said other edge devices having intended recipients connected thereto;
    and further wherein said multicast proxy module performs the following functions for receiving multicast messages:
        (a) receiving modified multicast packets from said encrypted domain of said network;
        (b) removing the address of the receiving edge device from the address field of the modified multicast packet;
        (c) retrieving the multicast address from elsewhere in the multicast packet and moving it to said address field of the multicast packet; and
        (d) transmitting the multicast packet to the intended recipients.

2. The system of claim 1 wherein said proxy transmits the multicast packet to the intended recipients by sending the multicast packet to the multicast address.

3. The system of claim 1 wherein said proxy transmits the multicast packet to the intended recipients by sending the multicast packet to each local member of the multicast group.

4. The system of claim 1 wherein, for outgoing multicast messages, the address of the intended recipient is appended to the end of the multicast packet.

5. The system of claim 1 wherein modified multicast messages entering the encrypted domain of said network are encrypted by a HAIPE device and further wherein modified multicast messaged exiting said encrypted domain of said network are decrypted by a HAIPE device.

6. The system of claim 1 wherein said multicast proxy module performs the following functions when sending unicast control messages to join or leave a multicast group:
 (a) storing the source unicast address elsewhere in said multicast packet;
 (b) changing the unicast address to the address of the sending proxy;
 (c) modifying a local list of multicast group members to add or remove the original source unicast address; and
 (d) sending the modified unicast packet through said encrypted domain to all other known multicast proxies.

7. The system of claim 6 wherein the unicast address is stored at the end of the unicast packet.

8. The system of claim 1 wherein said multicast proxy module performs the following functions when receiving unicast control messages:
 (a) using the unicast address as the proxy address for associations; and
 (b) using the original unicast address as the member address for the multicast group.

9. The system of claim 8 wherein the original unicast address is stored at the end of the received packet.

10. The system of claim 1 where the function of sending the modified multicast packet through said encrypted domain further comprises sending the modified multicast packet to a HAIPE device for encryption.

11. The system of claim 1 where the function of receiving modified multicast packets from said encrypted domain further comprises receiving decrypted modified multicast packet from a HAIPE device.

12. The system of claim 1 wherein a portion of the address of the intended recipient is used to indicate the type of data contained in the multicast packet.

13. A method for implementing multicast messaging in a partitioned network, said partitioned network including an encrypted domain and a plurality of edge devices in an unencrypted domain connected thereto, comprising the steps of:
 (a) intercepting multicast packets;
 (b) determining which edge devices have intended recipients of said multicast messages connected thereto;
 (c) for each edge device having one or more intended recipients attached thereto, removing the multicast address and replacing it with the address of the edge device to which the intended recipient is connected;
 (d) storing the multicast address elsewhere in said multicast packet; and
 (e) sending the modified multicast packet through said encrypted domain to each of said edge devices having intended recipients connected thereto.

14. The method of claim 13 further comprising the steps of:
 (a) receiving modified multicast messages from edge devices;
 (b) removing the destination address from the address field of the modified multicast packet;
 (c) retrieving the multicast address from elsewhere in the multicast packet and moving it to said address field of the multicast packet; and
 (d) transmitting the multicast packet to the intended recipients.

15. The method of claim 14 wherein said step of transmitting the multicast packet to the intended recipients comprises transmitting the multicast packet to the multicast address.

16. The method of claim 14 wherein said step of transmitting the multicast packet to the intended recipients comprises comprising retrieving the address of all local intended recipients from a local list and sending the multicast packet to each of said local intended recipients.

17. The method of claim 13 further comprising the steps of
 (a) determining if the intercepted multicast packet is a multicast control message to join or leave a multicast group and if so, performing steps (b)-(e);
 (b) storing the source address elsewhere in said multicast packet;
 (c) changing the source address to the address of the local edge device;
 (d) modifying a local list of multicast group members to add or remove the original source address; and
 (e) sending the modified multicast control packet through said encrypted domain to all other known edge devices.

* * * * *